United States Patent [19]

Hepp

[11] Patent Number: 4,684,686

[45] Date of Patent: Aug. 4, 1987

[54] GLASS FIBER REINFORCED POLYESTER MOLDING COMPOSITIONS CONTAINING METAL POWDERS

[75] Inventor: Leonard R. Hepp, Evansville, Ind.

[73] Assignee: General Electric Company, Pittsfield, Mass.

[21] Appl. No.: 705,438

[22] Filed: Feb. 25, 1985

[51] Int. Cl.$^4$ .......................... C08K 7/14; C08K 3/08; C08L 67/02
[52] U.S. Cl. ................................. 524/281; 524/177; 524/382; 524/410; 524/411; 524/439; 524/440; 524/441; 524/504; 524/605
[58] Field of Search ............... 524/605, 281, 177, 382, 524/410, 411, 439, 440, 441, 504

[56] References Cited

U.S. PATENT DOCUMENTS

| | | | |
|---|---|---|---|
| 3,264,255 | 8/1966 | Taylor | 260/45.75 |
| 4,013,613 | 3/1977 | Abolins et al. | 260/40 R |
| 4,363,899 | 12/1982 | Shirahata | 524/440 |
| 4,446,271 | 5/1984 | Heater | 524/605 |

FOREIGN PATENT DOCUMENTS 54-68856  6/1979  Japan .................................. 524/605

Primary Examiner—C. Warren Ivy
Attorney, Agent, or Firm—William F. Mufatti; Michael J. Doyle; Martin Barancik

[57] ABSTRACT

Particulate and fibrous metal are disclosed to improve the physical properties of poly(1,4-butylene terephthalate) resin molding compositions.

16 Claims, No Drawings

GLASS FIBER REINFORCED POLYESTER MOLDING COMPOSITIONS CONTAINING METAL POWDERS

This invention relates to glass fiber reinforced poly(1,4-butylene terephthalate) resin molding compositions with improved physical properties. More particularly, this invention relates to glass fiber reinforced poly(1,4-butylene terephthalate) resin molding compositions containing metal powders for improved impact strength, flexural strength, tensile strength, flexural modulus, melt visocity, and arc track rate.

BACKGROUND

High molecular weight linear polyesters and copolymers of glycols and terephthalic or isophthalic acid have been available for a number of years. These are described inter alia in Whinfield, et al, U.S. Pat. No. 3,047,539. These patents disclose that the polyesters are particularly advantageous as film and fiber-formers.

Poly(1,4-butylene terephthalate), because of its very rapid crystallization from melt, is uniquely useful as a component in injection moldable compositions. Work pieces molded from such polyester resins, in comparison with other thermoplastics, offer a high degree of surface hardness and abrasion resistance, high gloss and low surface friction.

One useful family of such compositions comprises those which are reinforced, e.g., with from about 5% to about 55% filamentous glass, based on the weight of glass and polyester components, and optionally rendered flame retardant by the incorporation of a flame-retarding amount of a flame retarding compound.

The versatility of injection moldable compositions containing poly(1,4-butylene terephthalate) resin has been demonstrated, however, it is always desirable to increase the versatility of these compositions by the addition of additives and the like to modify the physical properties thereof. For example, U.S. Pat. No. 4,104,242, Kochanowski, et al., disclose the addition of a hydrazine compound to poly(1,4-butylene terephthalate) resin for modifying resistance to high voltage breakdown. Other properties, including impact strength, flexural strength, flexural modulus, tensile strength, melt viscosity, arc track rate, etc., may also be the object of such improvement efforts.

It is an object of the present invention to improve the physical properties of articles molded from glass fiber reinforced poly(1,4-butylene terephthalate) resin molding compositions.

It is another object of the present invention to improve the physical properties of articles molded from fiber reinforced, flame retarded poly(1,4-butylene terephthalate) resin molding compositions.

DESCRIPTION OF THE INVENTION

Briefly, there are provided by the present invention thermoplastic molding compositions, the articles molded from which exhibit improved physical properties, i.e. impact strength, flexural strength, flexural modulus, tensile strength, melt viscosity, arc track rate, etc., comprising:

(a) poly(1,4-butylene terephthalate) resin;
(b) a reinforcing amount of glass fiber reinforcement; and
(c) an effective amount of particulate metal to improve physical properties;

and optionally comprising:
(d) a flame retarding amount of halogenated aromatic flame retardant;
(e) an effective amount of antimony compound synergist;
(f) up to 80 weight parts of another thermoplastic resin per 20 weight parts poly(1,4-butylene terephthalate) resin;
(g) impact modifier; and
(h) stabilizers.

The poly(1,4-butylene terephthalate) resin used in this invention is one obtained by polymerizing a glycol component at least 70 mol %, preferably at least 80 mol %, of which consists of tetramethylene glycol and an acid component at least 70 mol %, preferably at least 80 mol %, of which consists of terephthalic acid, and polyester-forming derivatives therefore.

The glycol component can contain not more than 30 mol %, preferably not more than 20 mol %, of another glycol, such as ethylene glycol, trimethylene glycol, 2-methyl-1,3-propane glycol, hexamethylene glycol, decamethylene glycol, cyclohexane dimethanol, or neopentylene glycol.

The acid component can contain not more than 30 mol %, preferably not more than 20 mol %, of another acid such as isophthalic acid, 2,6-naphthalenedicarboxylic acid, 2,7-naphthalenedicarboxylic acid, 1,5-naphthalenedicarboxylic acid, 4,4'-diphenyldicarboxylic acid, 4,4'-diphenoxyethandicarboxylic acid, p-hydroxy benzoic acid, sebacic acid, adipic acid and polyester-forming derivatives thereof.

The aromatic polyester resin used in this invention preferably has an intrinsic viscosity [n] (measured in 60/40 by weight phenol/tetrachloroethane at 30° C.) of 0.3 to 1.5 dl./g.

The filamentous glass to be employed as reinforcement in the present compositions is well known to those skilled in the art and is widely available from a number of manufacturers. For compositions ultimately to be employed for electrical uses, it is preferred to use fibrous glass filaments comprised of lime-aluminum borosilicate glass that is relatively soda-free. This is known as "E" glass. However, other glasses are useful where electrical properties are not so important, e.g, the low soda glass known as "C" glass. The filaments are made by standard processes, e.g., by steam or air blowing, flame blowing and mechanical pulling. The preferred filaments for plastic reinforcement are made by mechanical pulling. The filament diameters range from about 0.00012 to 0.00075 inch but this is not critical to the present invention.

The length of the glass filaments and whether or not they are bundled into fibers and the fibers bundled in turn to yarns, ropes or rovings, or woven into mats and the like are also not critical to the invention. However, in preparing the molding compositions it is convenient to use the filamentous glass in the form of chopped strands of from about ⅛" to about 2" long. In articles molded from the compositions on the other hand, even shorter lengths will be encountered because, during compounding considerable fragmentation will occur. This is desirable, however, because the best properties are exhibited by thermoplastic injection molded articles in which the filament lengths lie between about 0.000005" and 0.125 (⅛").

In general, best properties will be obtained if the filamentous glass reinforcement comprises from about 2.5 to about 90% by weight based on the combined weight of glass and resin, and preferably from about 5 to about 55% by weight. It is especially preferred that the glass comprise from about 20 to about 40% by weight based on the combined weight of glass and resin. Generally, for direct molding use, up to about 60% of glass can be present without causing flow problems. However, it is useful also to prepare the compositions containing substantially greater quantities, e.g., up to 80–90% by weight of glass. These concentrates can be custom blended with resins that are not glass reinforced to provide any desired glass content of a lower value.

Particulate metal suitable for use herein includes metal powders, flakes, and fibers but preferably metal powders or flakes of common elemental metals. Preferred such metals include iron, copper, magnesium, aluminum, zinc, etc. The particle size of the particulate metal should be, in general, less than about ½ mm in diameter. Though metal fibers are not preferred for use herein, they are generally suitable where the fiber diameter is within the size range of the metal powder. The particulate metal for use in the molding composition may be a single metal or a blend of one or more metals. The amount of particulate metal necessary to desirably effect the physical properties of the molding composition varies with the metal or metals chosen, however, one skilled in the art can easily determine an appropriate amount. A preferred amount varies from about 0.1 to about 1.0 parts by weight particulate metal for each 70 parts by weight resin.

The amount of flame-retardant additive used is not critical to the invention, so long as it is present in an amount at least sufficient to reduce the flammability of the polyester resin. Those skilled in the art are well aware that the amount will vary with the nature of the resin and with the efficiency of the additive. In general, however, the amount of additive will be from 0.5 to 50 parts by weight per 100 parts of resin. A preferred range will be from about 3 to 50 parts and an especially preferred range will be from about 8 to 45 parts of additive per 100 parts of resin. Synergists, e.g., antimony oxide, will be used at about 2 to 15 parts by weight per 100 parts of resin.

Any of the conventional halogenated aromatic flame-retardants, such as decabromodiphenyl ether can be employed in the composition of the present invention. Preferred flame-retardants are aromatic carbonate homopolymers having repeating units of the formula:

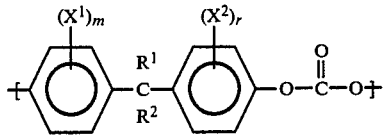

wherein $R^1$ and $R^2$ are hydrogen, (lower) alkyl or phenyl, $X^1$ and $X^2$ are bromo or chloro or mixtures thereof and m and r are from 1 to 4. It is especially preferred that $R^1$ and $R^2$ be methyl and that $X^1$ and $X^2$ be bromo. These materials may be prepared by techniques well known to those skilled in the art. Also preferred are aromatic carbonate copolymers in which from 25 to 75 weight percent of the repeating units comprise chloro- or bromo substituted dihydric phenol, glycol, or dicarboxylic acid units, e.g., A. D. Wambach, U.S. Pat. No. 3,915,926. A particularly preferred flame retardant herein is an aromatic copolycarbonate of 50:50 mole ratio of bisphenol-A and tetrabromobisphenol-A prepared like Procedure A of U.S. Pat. No. 3,915,926.

Moreover, the flame retardants used herein, such as the aromatic polycarbonate flame retardants, are used with a synergist, particularly inorganic or organic antimony compounds. Such compounds are widely available or can be made in known ways. In preferred embodiments, the type of antimony compound used is not critical, being a choice primarily based on economics. For example, as inorganic compounds there can be used antimony oxide ($Sb_2O_3$); antimony phosphate; $KSb(OH)_6$; $NH_4SbF_6$; $SbS_3$; and the like. A wide variety of organic antimony compounds can also be used, such as antimony esters with organic acids; cyclic alkyl antimonites; aryl antimonic acids and the like. Illustrative of the organic antimony compounds, including inorganic salts of such compounds, are: KSb tartrate; Sb caproate; $Sb(OCH_2CH_3)_3$; $Sb(OCH(CH_3)CH_2CH_3)_3$; Sb polymethylene glycolate; triphenyl antimony; and the like; especially preferred is antimony oxide.

The resin component in the molding compositions of the present invention may include in addition to the poly(1,4-butylene terephthalate) resin up to 50 weight parts of other thermoplastic resins per 50 weight parts of poly(1,4-butylene terephthalate) resin. Other suitable thermoplastic resins which may be used include acrylic and methacrylic polymers or copolymers; poly(ethylene terephthalate); epoxy resins; polycarbonates; polyetherimide; phenylene oxide based resins such as polyphenylene oxide and blends of polyphenylene oxide and styrene resins; polyaryl ethers; polyesters; polyethylene; polyphenylene sulfides; polypropylene; polysulfones; ethylene polymers such as ethyl vinyl acetates; and ordered aromatic copolymers, etc.

Furthermore, the composition of the present invention may further comprise an effective amount of any of the known impact modifiers useful for polyesters and polyester blends. These may be added to the compositions by themselves or in combination with the aforementioned aromatic polycarbonates.

The preferred impact modifiers generally comprise an acrylic or methacrylic grafted polymer of conjugated diene or an acrylate elastomer, alone or copolymerized with a vinyl aromatic compound. Especially preferred grafted polymers are the core-shell polymers of the type available from Rohm & Haas, for example Acryloid KM653, Acryloid KM330 and Acryloid KM611. In general these impact modifiers contain untis derived from butadiene or isoprene, alone or in combination with a vinyl aromatic compound, or n-butyl acrylate, alone or in combination with a vinyl aromatic compound. The aforementioned impact modifiers are believed to be disclosed in Fromuth, et al., U.S. Pat. No. 4,180,494; Owens, U.S. Pat. No. 3,808,180; Farnham, et al., U.S. Pat. No. 4,096,202; and Cohen, et al., U.S. Pat. No. 4,260,693, all incorporated herein by reference. Most preferably, the impact modifier will comprise a two stage polymer having either a butadiene or n-butyl acrylate based rubbery core and a second stage polymerized from methylmethacrylate alone or in combination with styrene. Also present in the first stage are cross linking monomers and graft linking monomers. Examples of the cross linking monomers include 1,3-butylene diacrylate, divinyl benzene and butylene dimethacrylate. Examples of graft linking monomers are allyl acrylate, allyl methacrylate and diallyl maleate.

Additional preferred impact modifiers are of the type disclosed in U.S. Pat. No. 4,292,233, incorporated by reference. These impact modifiers comprise, generally, a relatively high content of a cross-linked butadienepolymer grafted base having grafted thereon acrylonitrile and styrene.

Other suitable impact modifiers include, but are not limited to ethylene vinyl acetate, ethylene ethylacrylate copolymers, etc.

The method of blending the compositions of this invention is not critical and can be carried out by conventional techniques. One convenient method comprises blending the polyester and other ingredients in powder or granular form, extruding the blend and comminuting into pellets or other suitable shapes.

The ingredients are combined in any useful manner, e.g., by dry mixing or by mixing in the melted state in an extruder, on a heated mill or in other mixers.

By way of illustration, chopped glass (glass rovings which have been chopped into small pieces, e.g. ⅛ to 1 inch in length, and preferably less than ¼ inch in length) is put into an extrusion compounder with the polkyester resin, other ingredients, and optionally, other additive(s) to produce molding pellets. The fibers are shortened and predispersed in the process, coming out at less than 1/16 inch long. In another procedure, glass filaments are ground or milled to short lengths, and are mixed with the polyester resin and stabilizers, and, optionally other additive(s), by dry blending then either fluxed or a mill and ground, or they are extruded and chopped. The glass fibers can also be mixed with resin and additives and directly molded, e.g. by injection or transfer molding techniques.

It is always important to thoroughly free all of the ingredients, the polyester resin and other ingredients from as much water as possible.

Although it is not essential, best results are obtained if the ingredients are precompounded, pelletized and then molded. Precompounding can be carried out in conventional equipment. For example, after carefully predrying the polyester resin, other ingredients, and, optionally, other additives and/or reinforcements, a single screw extruder is fed with a dry blend of the composition, the screw employed having a long transistion section to insure proper melting. On the other hand, a twin screw extrusion machine can be fed with resins and additives at the feed port and reinforcement down stream. In either case, a generally suitable machine temperature will be about 450° to 575° F.

The precompounded composition can be extruded and cut or chopped into molding compounds, such as conventional granules, pellets, etc. by standard techniques.

The compositions can be molded in any equipment conventionally used for thermoplastic compositions. For example, good results will be obtained in an injection molding machine, e.g. of the Van Dorn type, with conventional cylinder temperatures, e.g., 500° F. and conventional mold temperatures e.g., 150° F. If necessary, depending on the molding properties of the polyester, the amount of additives and/or reinforcing filler and the rate of crystallization of the polyester component, those skilled in the art will be able to make the conventional adjustments in molding cycles to accommodate the composition.

The compositions of this invention may be used alone as molding pellets or mixed with other polymers and may contain additional, non-reinforcing fillers, such as wood flour, cloth fibers and the like, as well as pigments, dyes stabilizers, plasticizers, and the like.

Other additives, i.e., stabilizers, fillers, and the like may also be present. One skilled in the art may readily determine which are necessary and suitable for a particular application.

DESCRIPTION OF THE PREFERRED EMBODIMENTS

The following examples illustrate the preparation of certain compositions with the scope of this invention. They are not to be construed to limit the invention in any manner whatsoever. All parts, except as otherwise indicated, are by weight.

| Tests | | |
|---|---|---|
| Notched and Unnotched Izod | ASTM | D256 |
| Flexural Strength | ASTM | D790 |
| Flexural Modulus | ASTM | D790 |
| Tensile Strength (Type V bar) | ASTM | D638 |
| Arc Track Rate | UL | 746A |

EXAMPLES 1-12

The formulations shown below were preblended and extruded on a 1¾" Sterling Extruder having a barrel temperature profile of 540° F. - 560° F. - 580° F. and a die head temperature of 520° F. The extrudate was cooled through a water bath prior to pelletizing. Test parts were injection molded on a 3 oz. Van Dorn molding press with a set temperature of approximately 480° F. The resin was dried for four hours at 250° F. in a forced air circulating oven prior to injection molding.

| | 1* | 2 | 3 | 4 | 5 | 6 | 7 | 8 | 9 | 10 | 11 | 12 |
|---|---|---|---|---|---|---|---|---|---|---|---|---|
| PBT[1] | 69.8 | 69.7 | 69.5 | 69.3 | 69.7 | 69.5 | 69.7 | 69.5 | 69.7 | 69.5 | 69.7 | 69.5 |
| Glass, K-filament | 30 | 30 | 30 | 30 | 30 | 30 | 30 | 30 | 30 | 30 | 30 | 30 |
| Stabilizer[2] | 0.15 | 0.15 | 0.15 | 0.15 | 0.15 | 0.15 | 0.15 | 0.15 | 0.15 | 0.15 | 0.15 | 0.15 |
| Stabilizer[3] | 0.05 | 0.05 | 0.05 | 0.05 | 0.05 | 0.05 | 0.05 | 0.05 | 0.05 | 0.05 | 0.05 | 0.05 |
| Iron Powder | — | 0.1 | 0.3 | 0.5 | — | — | — | — | — | — | — | — |
| Copper Powder | — | — | — | — | 0.1 | 0.3 | — | — | — | — | — | — |
| Magnesium Powder | — | — | — | — | — | — | 0.1 | 0.3 | — | — | — | — |
| Zinc Powder | — | — | — | — | — | — | — | — | 0.1 | 0.3 | — | — |
| Aluminum Powder | — | — | — | — | — | — | — | — | — | — | 0.1 | 0.3 |
| Notched Izod, ft. lbs/in. | 1.8 | 1.7 | 1.8 | 1.9 | 1.8 | 2.2 | 1.7 | 1.8 | 1.8 | 1.7 | 1.7 | 1.9 |
| Unnotched Izod, ft. lbs/in. | 11.2 | 10.9 | 11.5 | 13.3 | 11.0 | 13.0 | 10.2 | 10.4 | 11.6 | 10.9 | 10.3 | 10.7 |
| Flexural Strength, psi × $10^3$ | 24.8 | 24.6 | 25.8 | 27.5 | 27.2 | 25.2 | 25.2 | 25.3 | 26.1 | 25.3 | 26.1 | 25.3 |
| Flexural Modulus, psi × $10^5$ | 9.5 | 9.5 | 10.1 | 10.1 | 10.1 | 10.1 | 10.1 | 9.9 | 9.9 | 10.1 | 9.9 | 10.1 |

-continued

|  | 1* | 2 | 3 | 4 | 5 | 6 | 7 | 8 | 9 | 10 | 11 | 12 |
|---|---|---|---|---|---|---|---|---|---|---|---|---|
| Tensile Strength, psi × 10³ | 15.9 | 15.5 | 15.6 | 16.9 | 16.3 | 17.3 | 15.7 | 15.7 | 15.9 | 15.7 | 15.7 | 16.0 |
| Melt Viscosity of Pellets, (482° F.) Poise × 10³ | 18.9 | 15.5 | 13.2 | 16.0 | 14.6 | 14.2 | 13.0 | 13.2 | 13.7 | 13.0 | 13.4 | 13.3 |
| Arc Track Rate in/min | 0.88 | 0.48 | 0.75 | — | 0.95 | 0.85 | 0.75 | 0 | 0 | 0.8 | 0.45 | 0.63 |

[1] poly(1,4-butylene terephthalate) resin, VALOX ® resin grade 300, M.V. = 2200–3800 poise, General Electric Company
[2] hindered phenol antioxidant
[3] phosphorous based stabilizer
*Control

EXAMPLES 13-15

The method of Examples 1-12 was used to produce test pieces of the formulations shown below.

|  | 1* | 13 | 14 | 15 |
|---|---|---|---|---|
| PBT[1] | 69.8 | 69.6 | 69.6 | 69.6 |
| Glass[6] | 30 | 30 | 30 | 30 |
| Stabilizer[2] | 0.15 | 0.15 | 0.15 | 0.15 |
| Stabilizer[3] | 0.05 | 0.05 | 0.05 | 0.05 |
| Iron Powder | — | 0.1 | 0.1 | — |
| Copper Powder | — | 0.1 | — | 0.1 |
| Magnesium Powder | — | — | 0.1 | — |
| Zinc Powder | — | — | — | 0.1 |
| Aluminum Powder | — | — | — | — |
| Notched Izod, ft lbs/in | 1.8 | 2.1 | 2.1 | 2.1 |
| Unnotched Izod, ft lbs/in | 11.2 | 12.7 | 12.7 | 13.0 |
| Flexural Strength psi × 10³ | 24.8 | 26.8 | 27.3 | 27.2 |
| Flexural Modulus, psi × 10⁵ | 9.5 | 9.5 | 9.7 | 10.1 |
| Tensile Strength, psi × 10³ | 15.9 | 17.1 | 17.3 | 17.0 |
| Melt Viscosity of Pellets (482° F.) Poise × 10³ | 18.9 | 14 | 15.1 | 15 |
| Arc Track Rate | 0.88 | 0.02 | 0.02 | 0.07 |

-continued

|  | 1* | 13 | 14 | 15 |
|---|---|---|---|---|
| in/min |  |  |  |  |

[1] poly(1,4-butylene terephthalate) resin, VALOX ® resin grade 300, M.V. = 2200 – 3800 poise, General Electric Company
[2] hindered phenol antioxidant
[3] phosphorous based stabilizer
[6] filament diameter = .000525 in.
*Control

EXAMPLE 16-23

The method of Examples 1-12 was used to produce test pieces of the formulations shown below:

|  | 16* | 17 | 18 | 19 | 20 | 21 | 22 | 23 |
|---|---|---|---|---|---|---|---|---|
| PBT[1] | 47.65 | 47.35 | 47.35 | 47.35 | 47.35 | 47.45 | 47.45 | 47.45 |
| Glass[6] | 30 | 30 | 30 | 30 | 30 | 30 | 30 | 30 |
| Stabilizer[2] | 0.15 | 0.15 | 0.15 | 0.15 | 0.15 | 0.15 | 0.15 | 0.15 |
| Flame Retardant[4] | 15 | 15 | 15 | 15 | 15 | 15 | 15 | 15 |
| $Sb_2O_3$ Concentrate | 7.1 | 7.1 | 7.1 | 7.1 | 7.1 | 7.1 | 7.1 | 7.1 |
| Teflon 6[5] | 0.1 | 0.1 | 0.1 | 0.1 | 0.1 | 0.1 | 0.1 | 0.1 |
| Iron Powder | — | 0.3 | — | — | — | 0.1 | — | — |
| Copper Powder | — | — | 0.3 | — | — | 0.1 | 0.1 | 0.1 |
| Magnesium Powder | — | — | — | 0.3 | — | — | 0.1 | — |
| Zinc Powder | — | — | — | — | 0.3 | — | — | 0.1 |
| Notched Izod, ft lbs/in | 1.7 | 1.9 | 1.8 | 1.9 | 1.7 | 1.8 | 1.8 | 1.8 |
| Unnotched Izod, ft lbs/in | 12.0 | 13.1 | 13.3 | 12.9 | 12.5 | 13.1 | 12.4 | 11.1 |
| Flexural Strength, psi × 10³ | 27.9 | 29.1 | 28.9 | 28.8 | 28.4 | 30.8 | 29.8 | 31.9 |
| Flexural Modulus, psi × 10⁵ | 11.0 | 11.7 | 11.5 | 11.5 | 11.5 | 12.6 | 13.2 | 13.2 |
| Tensile Strength, psi × 10³ | 17.1 | 18.6 | 18.6 | 17.4 | 17.9 | 18.4 | 17.6 | 17.7 |
| Melt Viscosity of Pellets, (482° F.) Poise × 10³ | 34.3 | 26.2 | 27.7 | 29.1 | 29.0 | 30.7 | 26.6 | 30.4 |
| Arc Track Rate, in/min | 5.8 | 0 | 2.1 | 0.75 | 0.25 | 0 | 0 | 2.3 |

[1] poly(1,4-butylene terephthalate) resin, VALOX ® resin grade 300 M.V. = 2200–3800 poise (melt viscosity measured at 250° C.), General Electric Company
[2] hindered phenol anti oxidant
[4] tetra bromo bisphenol oligomer with phosgene
[5] drip suppressant
[6] filament diameter = .000525 in.
*Control

What is claimed is:

1. A poly(1,4-butylene terephthalate) thermoplastic molding composition exhibiting at least improved flexural properties and melt viscosity comprising:
   (a) a thermoplastic poly(1,4-butylene terephthalate) resin which remains thermoplastic during formulation and processing of said composition;
   (b) a reinforcing amount of glass fiber reinforcement; and
   (c) an effective amount of particulate metal to improve at least the flexural properties and melt viscosity of said thermoplastic poly(1,4-butylene terephthalate) resin and reinforcing amount of glass fiber reinforcement, said amount being from at least about 0.1 parts by weight of said metal for each 70 parts by weight of resin and not exceeding about 1.0 parts by weight of said metal for each 70 parts by weight of resin.

2. The molding composition of claim 1 which additionally comprises a flame retarding amount of halogenated aromatic flame retardant.

3. The molding composition of claim 2 which additionally comprises an effective amount of antimony compound synergist.

4. The molding composition of claim 1 wherein said particulate metal is selected from the group consisting of iron, copper, magnesium, aluminum, and zinc.

5. The molding composition of claim 4 wherein said metal powder comprises at least two of said group of particulate metals.

6. The molding composition of claim 1 which additionally contains an impact modifiying amount of impact modifier.

7. A poly(1,4-butylene terephthalate thermo-plastic molding composition exhibiting at least improved flexural properties and melt viscosity comprising :
   (a) a thermoplastic poly(1,4-butylene terephthalate) resin which remains thermoplastic during formulation and processing of said composition;
   (b) a reinforcing amount of glass fiber reinforcement; and
   (c) from about 0.1 to about 1.0 parts by weight particulate metal selected from the group consisting of iron, copper, magnesium, aluminum, and zinc for each 70 parts by weight resin.

8. The thermoplastic molding composition of claim 7 which additionally comprises a flame retarding amount of halogenated aromatic flame retardant.

9. The molding composition of claim 8 which additionally contains an effective amount of antimony compound synergist.

10. The molding composition of claim 7 wherein said particulate metal comprises at least two of said group of particulate metals.

11. The molding composition of claim 9 which additionally contains an impact modifying amount of impact modifier.

12. A poly(1,4-butylene terephthalate) thermo-plastic molding composition comprising:
   (a) poly(1,4-butylene terephthalate) resin;
   (b) a reinforcing amount of glass fiber reinforcement; and
   (c) from about 0.1 to about 1.0 parts by weight for each 70 parts by weight of resin of particulate metal selected from the group consisting of iron, magnesium, aluminum and zinc.

13. The molding composition of claim 12 which contains at least two of said particulate metals.

14. The molding composition of claim 12 which contains a flame retardant amount of a halogenated aromatic flame retardant.

15. The molding composition of claim 14 which additionally contains an effective amount of antimony compound synergist.

16. The molding composition of claim 12 which additionally contains an impact modifying amount of an impact modifier.

* * * * *